United States Patent
Tsujino et al.

[11] Patent Number: 5,846,465
[45] Date of Patent: Dec. 8, 1998

[54] METHOD FOR PREPARING A PLATE MEMBER FOR A WINDOW WITH A RESINOUS FRAME

[75] Inventors: Masaki Tsujino; Noriyuki Yoshihara; Koji Koganezawa, all of Yokohama, Japan

[73] Assignee: Asahi Glass Company, Ltd., Tokyo, Japan

[21] Appl. No.: 614,928

[22] Filed: Mar. 11, 1996

[30] Foreign Application Priority Data

Mar. 16, 1995 [JP] Japan .................................. 7-057739

[51] Int. Cl.$^6$ .................................................. B29C 47/92
[52] U.S. Cl. ................... 264/252; 156/108; 156/244.11; 156/500; 264/259; 264/177.17
[58] Field of Search ..................... 264/252, 259, 264/177.17; 156/108, 244.11, 245, 500

[56] References Cited

U.S. PATENT DOCUMENTS

| | | | |
|---|---|---|---|
| 4,090,835 | 5/1978 | Bronson, Jr. et al. | 264/171.13 |
| 5,057,265 | 10/1991 | Kunert et al. . | |
| 5,242,518 | 9/1993 | Riederer | 156/108 |
| 5,362,428 | 11/1994 | Tsujino et al. . | |
| 5,382,395 | 1/1995 | Hoenke et al. | 156/108 |
| 5,489,409 | 2/1996 | Koganezawa et al. . | |
| 5,507,994 | 4/1996 | Cornils et al. | 156/108 |
| 5,554,325 | 9/1996 | Kotte et al. | 156/108 |

FOREIGN PATENT DOCUMENTS

| | | |
|---|---|---|
| 57-158479 | 9/1982 | Japan . |
| 57-158480 | 9/1982 | Japan . |
| 57-158481 | 9/1982 | Japan . |
| 58-73681 | 5/1983 | Japan . |

*Primary Examiner*—Jeffery R. Thurlow
*Attorney, Agent, or Firm*—Sughrue, Mion, Zinn, Macpeak & Seas, PLLC

[57] ABSTRACT

A method of preparing a window panel with a resinous frame, comprises relatively moving a window panel and a die for extruding a resinous material so that the die is moved along a peripheral portion of the window panel, and extruding the resinous material from the die in a predetermined shape to form a shaped product for a resinous frame on the peripheral portion of the window panel; wherein the relative movement of the die and the window panel is carried out by using an operating robot which has been taught a track to follow; and wherein the operating robot has been taught another track so as to separate the die and the panel when the die has moved around the peripheral portion of the window panel and has returned at a position just before a beginning of the shaped product, thereby to form the frame on the window panel in a one-piece construction.

22 Claims, 5 Drawing Sheets

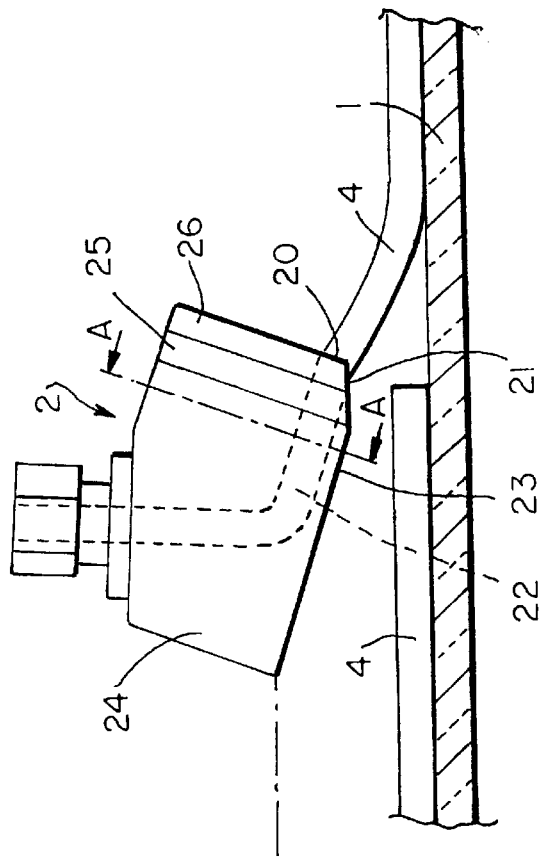
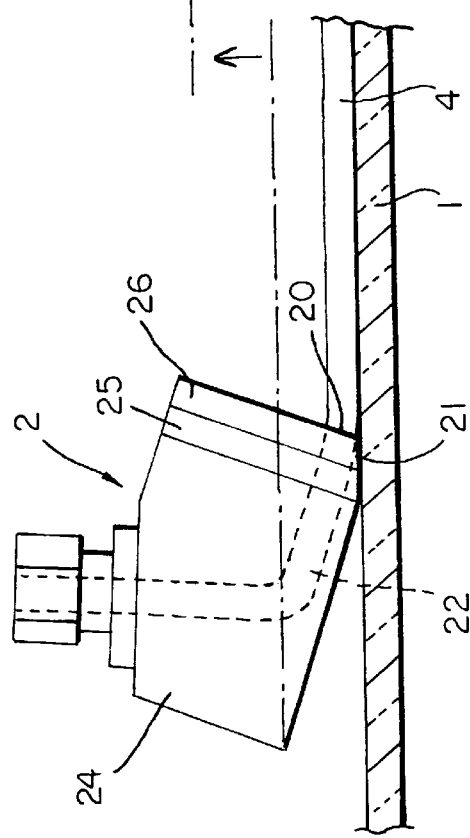
FIG. 2 (b)
FIG. 2 (a)

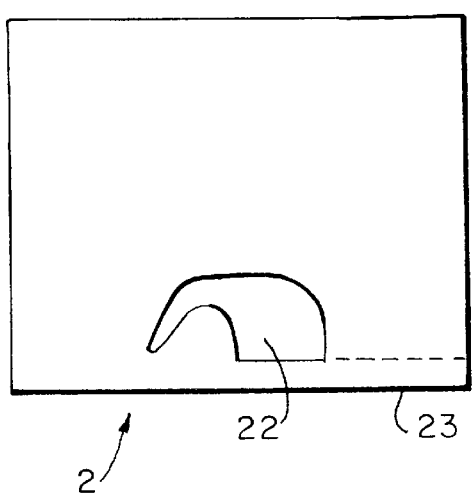
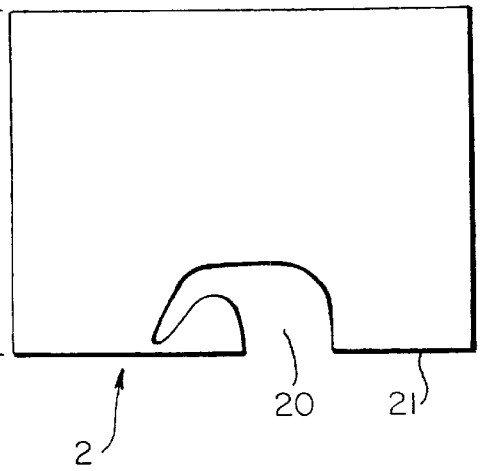
FIG.3(a)  FIG.3(b)
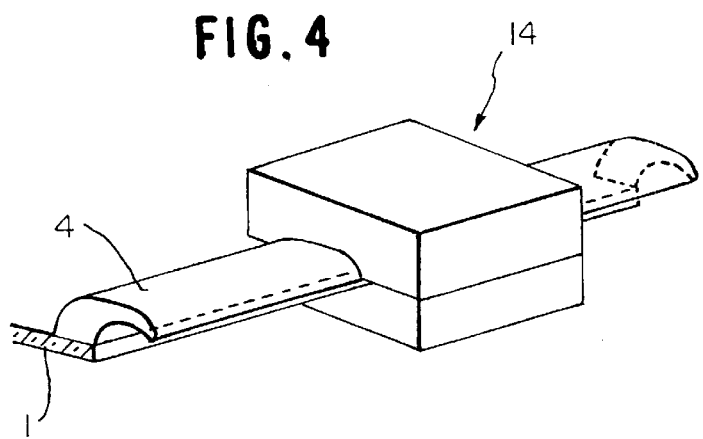
FIG.4

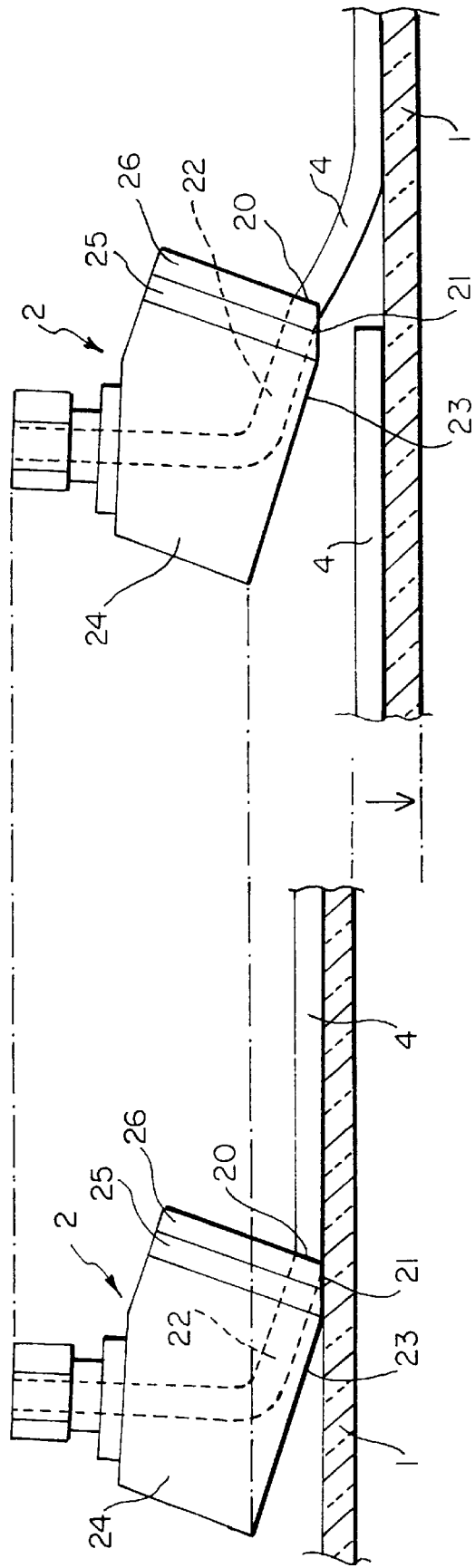

METHOD FOR PREPARING A PLATE MEMBER FOR A WINDOW WITH A RESINOUS FRAME

BACKGROUND OF THE INVENTION

1. Field of the Invention

The present invention relates to a method of preparing a window panel with a resinous frame, which is suitable for a window pane fitted into a window opening in vehicles and buildings.

2. Prior Art

A window for vehicles or buildings is constituted by attaching a resinous frame such as a molded member or a gasket in a space between a window panel such as glass sheet or plastic sheet, and an opening with the window panel fitted therein. Thus, ornamentality and sealing feature of the window can be improved.

In conventional attachment of such a resinous frame, there have been carried out post-attachment methods wherein a resinous frame which has been shaped by e.g. injection molding or extrusion molding is bonded to a peripheral portion of a window panel, and wherein a resinous frame shaped by extrusion molding and so on is press-fitted into the space after the window panel is put into the opening, as described in e.g. JP-A-57158479 and JP-A-57158480. However, those methods have created problems in that it is difficult to automate operations because of need for human hands in most of the operations, and that presence of a lot of operation steps requires a substantial cost.

In the conventional post-attachment methods, the window panel and the resinous frame are bonded together, using a moisture setting urethane type sealant or a two component reactive setting urethane type sealant which has in general high bonding strength to glass and excellent durability. The sealant is normally injected into a groove which works as a bonding surface of the resinous frame for the window panel. It is difficult to apply the sealant evenly and thinly because the sealant is highly viscous and in a sol state.

Accordingly, when the resinous frame is forcibly fitted to a surface of the window panel, an excessive amount of the adhesive agent has been squeezed out from an edge of the bonding surface. As a result, it has been necessary to cut off the squeezed portion by hand. In addition, unevenness in applying thickness of the sealant has sometimes produced irregularities on a surface of the resinous frame, creating a deficiency such as poor appearance.

Since the time required for the adhesive agent to set is a long period ranging from several hours to a full day, there have been required many jigs which apply a pressure to the resinous frame after having fitted the resinous frame into the window panel, and a lot of equipment and spaces where window panels with the resinous frame are stored until the adhesive agent has set.

In order to solve those problems, there has been proposed a method wherein a synthetic resin or its raw material is injected into a mold cavity with a window panel arranged therein to form a resinous frame and so on on a peripheral portion of the panel in a one-piece construction (see JP-A-57158481 and JP-A-5873681).

In this method, the window panel is sandwiched between stiff mold halves made of metal and so on, and a synthetic resinous material or its raw material is injected into the cavity defined by the peripheral portion of the window panel and an inner surface of the mold. Although this method has an advantage of minimizing labor on shaking and of giving a high degree of dimensional accuracy to a product, the method creates a problem wherein when the window panel is glass sheet, the glass sheet is very fragile on clamping because of in particular a warp or insufficient bending working accuracy thereof. In order to prevent the glass sheet from being broken on clamping, there has been proposed a mold which is contrived to arrange elastic members on surfaces of the mold halves which the glass sheet contacts with, or to use means such as springs to press the glass sheet at a constant pressure, and which can not completely solve the problem of breakage in the window panel.

In U.S. Pat. No. 5,057,265, there is proposed a method wherein a synthetic resinous material is extruded from a die in a predetermined shape along a peripheral portion of glass sheet to form a shaped product of a resinous frame on the peripheral portion of the glass sheet, and the shaped product of the resinous frame is set to unify the glass sheet and the resinous frame.

When the synthetic resinous material is extruded along the peripheral portion of the glass sheet, the extruded material has a beginning and an end inevitably produced. When the frame is formed along the entire circumference of the glass sheet, the beginning and the end of the resinous material produce a seamed portion in the shaped product therebetween in order to unite the end to the beginning. When the end of the extruded resinous material is to be conformed to the beginning of the already formed shaped product at that time, the beginning of the shaped product obstructs the movement of the die. As a result, a defective portion in shape of the shaped product due to e.g. a gap without the shaped product formed therein or protuberance of the resinous material is produced at the seamed portion in the shaped product.

In the method disclosed in the U.S. patent, after the die has been moved immediately upward at the seamed portion, the die is moved toward a peripheral portion of the glass sheet. As a result, the seamed portion has protuberance of the resinous material formed thereon so as to almost contact with the beginning of the shaped product. After the die has been away, the seamed portion is pinched by a punch from above and below of the seamed portion to modify the shape of the shaped product by clamping, thus finishing the appearance of the shaped product at the seamed portion.

However, this method can not give good appearance to the shaped product in a sufficient manner by punching the seamed portion from upward and downward when the resinous material is excessively supplied or the resinous material is insufficiently supplied. For example, when the resinous material is excessively supplied, the resinous material is squeezed out from a gap formed in the punch. When the resinous material is insufficiently supplied, an appearance modified portion surrounded by an inner wall of the punch is filled with the resinous material insufficiently, forming irregularities on a surface of the frame.

In the case of pinching by the punch, it is necessary to firmly clamp the shaped product together with the glass sheet in order to modify the appearance of the shaped product. This operation step becomes complicated, and there is a possibility that the glass sheet might be broken.

There has also been proposed that some length of a gap is formed between the beginning and the end without bringing the die to the beginning, and that a partial frame member separately formed is inserted into the gap. However, this proposal also has problems in that the operation step becomes complicated, a bonding force between the glass sheet and the frame member is insufficient, and connecting portions between the frame member and the shaped product extruded from the die have poor appearance.

As stated earlier, these proposals which intend to improve the appearance and the bonding force at the seamed portion of the resinous frame have failed to achieve sufficient improvement in complication of the operation step and the appearance. It is an object of the present invention to solve the problems of the prior art as mentioned above, and to provide a new method of preparing a window panel with a resinous frame which has not been known.

SUMMARY OF THE INVENTION

The present invention is proposed to solve the problems, and the subject matter of the invention is a method of preparing a window panel with a resinous frame, comprising relatively moving a window panel and a die for extruding a resinous material so that the die is moved along a peripheral portion of the window panel, and extruding the resinous material from the die in a predetermined shape to form a shaped product for a resinous frame on the peripheral portion of the window panel, wherein the relative movement of the die and the panel is carried out by using an operating robot which has been taught a track to follow, and wherein the operating robot has been taught the track so as to separate the die and the panel when the die has moved around the peripheral portion of the panel and has returned at a position just before a beginning of the shaped product.

Another subject matter of the present invention is a method of preparing a window panel with a resinous frame wherein the window panel includes a surface, a rear surface thereof and an end surface, comprising relatively moving a window panel and a die for extruding a resinous material so that the die is moved along a surface, or a surface and an end surface at a peripheral portion of the window panel, and extruding the resinous material from the die in a predetermined shape to form a shaped product for a resinous frame on the surface, or the surface and the end surface at the peripheral portion of the window panel in a one-piece construction, wherein the relative movement of the die and the panel is carried out by using an operating robot which has been taught a track to follow, and wherein the operating robot has been taught the track to follow so as to separate the die and the panel when the die has moved around the peripheral portion of the panel and has returned as a position just before a beginning of the shaped product.

BRIEF DESCRIPTION OF THE DRAWINGS

FIGS. 2(a) and 2(b) are a side view (a) of the essential portions when other portions than a seamed portion are formed in the example of FIG. 1, and a side view (b) of the essential portions when the seamed portion is shaked;

FIGS. 3(a) and 3(b) are a sectional front view (sectional view taking along the line A—A of FIG. 2(b)) of an example of a portion of the die upstream of its extruding orifice in accordance with the present invention, and a front view (b) of the extruding orifice of the die as viewed from the front;

FIG. 4 is a schematic view explaining an example of the process to bond a shaped product to a panel after shaping in accordance with the present invention;

FIGS. 6(a) and 6(b) are a side view (a) of the essential portions when other portions than a seamed portion are formed in the example of FIG. 5, and a side view (b) of the essential portions when the seamed portion is shaped.

PREFERRED EMBODIMENT

Figure 1:
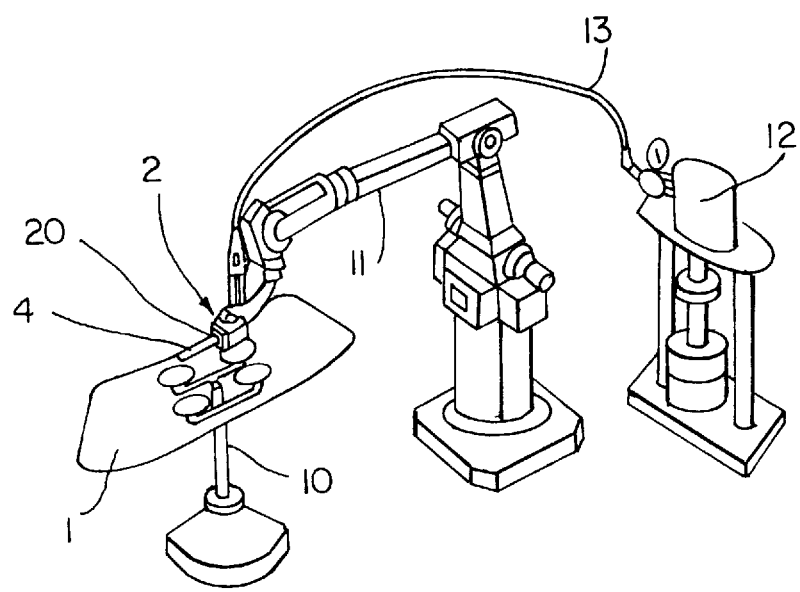
FIG. 1 is a schematic perspective view showing an example of the method of preparing a window panel with a resinous frame according to the present invention.

Now, the present invention will be described in detail with reference to the accompanying drawings. FIG. 1 is a schematic perspective view showing an example of the method of preparing a window panel with a resinous frame according to the present invention. A panel 1 was put on and secured to a holding table 10. A die 2 for extruding a material for a shaped product 4 to be shaped at a peripheral portion of the panel 1 was mounted to an arm of an operating robot 11. To the die 2 was mounted a heat-resistant hose 13 which supplies the material to the die from a material supplying device 12.

Under such an arrangement, the die was driven by the operating robot 11 to be moved along the peripheral portion of the panel 1. While carrying out the movement, the resinous material was extruded from an orifice 20 of the die 2 which had a cross-section in opening to substantially conform with the cross-section of the shaped product 4. The shaped product thus extruded was cut to separate the die and the shaped product, and the shaped product was solidified or cured, causing a resinous frame to be formed at the peripheral portion of the panel in a one-piece construction.

FIGS. 2 are views as viewed from one side of essential portions of FIG. 1. In FIG. 2(a), there is shown shaping of a portion before reaching a seamed portion, and in FIG. 2(b) there is shown shaping of the seamed portion. By dotted lines in the die 2 are indicated a resinous material passage 22 and a material supplying path communicating with the resinous material passage.

In FIG. 2(a), the panel 1, and a forward bottom 21 of the die 2 which is substantially in parallel with a surface of the panel 1 were opposed so as to contact with or be slightly apart from each other. In this case, the operating robot was taught a track to move the die 2, and the die 2 was moved along the peripheral portion of the panel 1. As a result, the positional relationship between the panel 1 and the die 2 was also controlled by the operating robot.

When the die moved around the peripheral portion of the panel and returned to a beginning of the shaped product, the die 2 was moved apart from the panel 1 diagonally upward in an advancing direction. Such movement of the die 2 was also realized by having previously taught the required movement to the operating robot. In order to readily understand the movement of the die 2, there are shown chain lines between FIG. 2(a) and (b) to clarify the vertically positional relationship to the panel. Because the position of the die 2 moved upward with respect to the panel 1 while the die 2 continued to advance, the die 2 was moved apart from the panel 1 diagonally upward in the advancing direction.

As shown later, the passage 22 in the die 2 has a cross-section to substantially conform with the cross-section of the shaped product. The resinous material is passed through the passage 22, causing the resinous material to be shaped to give a predetermined cross-section to the shaped product 4. This means that the shaped product 4 is extruded to have the predetermined cross-section from the die 2 even after the die 2 has separated from the panel 1.

In FIG. 3(a) is shown a sectional view of a portion of the die 2 which is located upstream in the flowing direction of the material and behind the extruding orifice 20, i.e. a sectional view taking along line A—A of FIG. 2(b) if FIG. 2(b) is given as an example, and in FIG. 3(b) is shown a front view of the die as viewed from the extruding orifice. The passage 22 is surrounded by an inner wall of the die 2 on all sides, and has a cross-section to substantially conform with the cross-section of the shaped product. The passage 22 was arranged in substantial parallel with a rear bottom 23. The resinous material supplying path which was located further upstream from the portion of the passage near to the rear bottom was raised up substantially vertically with respect to the passage, and was connected to the heat-resistant hose for supplying the resinous material (see FIG. 2). The extruding orifice 20 was opened at a side facing the panel. The cross-section of the opening defined by the panel and the inner wall of the die 2 was substantially conformed with the cross-section of the shaped product. The panel and the extruded resinous material contacted together at this opened side, causing the shaped product extruded from the orifice to be formed on the panel in a one-piece construction.

In the example, the die was moved by the operating robot, causing the die to carry out relative movement around the panel along its peripheral portion. Conversely, the panel may be mounted to the arm of the operating robot, and the panel may be moved by the operating robot, causing the die to carry out the relative movement around the panel along its peripheral portion. In addition, the die and the panel may be independently moved with predetermined timing, causing the die to carry out the relative movement along the peripheral portion of the panel.

Figure 5:
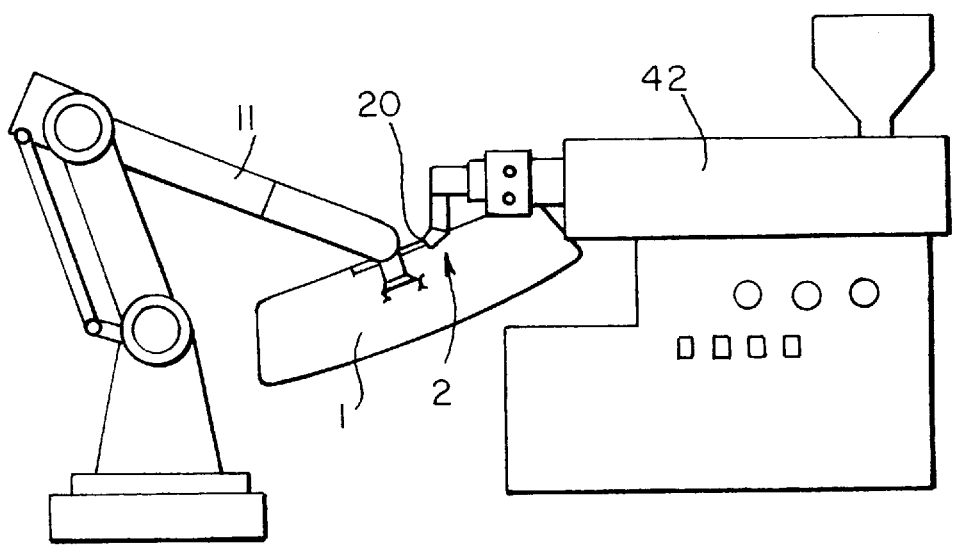
FIG. 5 is a schematic perspective view showing another example of the method of preparing a window panel with a resinous frame according to the present invention.

In FIG. 5, there is shown a example of an arrangement wherein the panel is driven and the die is fixed, presently one of the relative movement measures. The die 2 which extrudes the material for the shaped product 4 to be formed on the peripheral portion of the panel 1 is fixed on a leading end of the main body 42 of the extruder. The panel 1 is attached to the arm of the operating robot 11. Under such an arrangement, the panel 1 is driven by the operating robot 11 so that the die 2 is relatively moved along the peripheral portion of the panel 1. While carrying out the movement the shaped product 4 for the resinous frame is formed on the peripheral portion of the panel in a one-piece construction by extruding the resinous material from the extruding orifice of the die which has a cross-section in opening to substantially conform with the cross-section of the shaped product.

In this case as well, the frame can be formed to have good appearance by extruding the material under the positional relationship of the die and the panel shown in FIG. 6. Specifically, as shown in FIG. 6, the panel 1, and the forward bottom of the die which is substantially in parallel with the surface of the panel 1 are opposed so as to contact with or be slightly apart from each other. The operating robot is taught a track to move the panel 1, causing the panel 1 to be moved so that the die 2 moves along the peripheral portion of the panel. When the panel moves around the die 2 and returns to the beginning of the shaped product, panel 1 is moved diagonally downward with respect to the die 2 to be apart from the die. Such movement of the panel 1 can be also realized by having previously taught the required movement to the operating robot. In order to readily understand the movement of the panel 1, there are shown chain lines between FIGS. 6(a) and (b) to clarify the vertically positional relationship with respect to the die. Since the position of the panel 1 is moved downward with respect to the die 2 at the seamed portion and the panel 1 continues to advance, the panel 1 is moved apart from the die 2 diagonally downward in the advancing direction.

As seen from FIG. 2(a), FIG. 3(b) and 6(a), when a portion of the shaped product which has not arrived at the seamed portion is shaped, the forward bottom 21 opposed to the panel 1 has a lower side opened at the extruding orifice 22 of the die 2. The operating robot is controlled so that the die 2 and the panel 1 are arranged so as to form substantially the same cross-section as the cross-section of the shaped product by the surface of the panel 1 and the inner wall at the three sides of the die 2 except for the opened side.

In FIG. 4, there is shown a schematic view explaining an example of a process to bond an already formed shaped product to the panel in accordance with the present invention. The extruded shaped product 4 is sometimes prevented from being bonded to the panel 1 at the seamed portion where the die is apart from the panel. In that case, the shaped product has the seamed portion pressed by a suitable pressing jig 14 to bond the seamed portion of the shaped product 4 to the panel.

The pressing jig may either pinch the panel 1 and the shaped product 4 from upper and lower surfaces of the panel 1 as shown or press the shaped material 4 from only upward. In particular, in accordance with the present invention, the material is extruded from the extruding orifice so as to sufficiently form the shaped product in a desired shape, eliminating the need for firmly pinching the panel and the shaped product to give the desired shape to the shaped product. This minimizes the danger of the panel being broken.

As the material for the pressing jig, a metallic material, a heat-resistant plastic material, a rubber material, a ceramic material and so on can be used. The pressing jig may be e.g. substantially in the shape of a rod, be in the shape of a rod with curved in section, or be formed to have a recessed portion similar to the cross-section of the shaped product. The shape of the pressing jig has no limitation as long as the pressing jig has such a shape to be able to press the shaped product to the panel in a sufficient manner. From the viewpoint that better appearance is given to the shaped product, it is preferable that the pressing jig is formed to have a recessed portion similar to the cross-section of the shaped product including the panel.

As the panel used in the present invention, various types of materials such as ordinary single glass sheet, tempered glass subjected to heat treatment or chemical treatment, laminated glass, and a transparent organic resinous plate can be used. The frame can be unified to the panel regardless of that the panel is of a flat plate shape or a curved shape.

As the thermoplastic resin which is one of the resinous material for shaping the frame according to the present invention and which is heated and melted for use, e.g. a polyvinyl chloride, a copolymer of a vinyl chloride and an ethylene, a styrene resin, or an olefin resin can be used. As a thermoset resin which is shaped at an ordinary temperature, a moisture setting urethane resin or silicone resin can be used. Besides, e.g. a vinyl chloride in a sol state which forms the frame by post heating the shaped product extruded from the die and shaped by the die can be used. Using the thermoplastic resin among those material is preferable because the shaped product can be solidified only by being left for cooling after shaping, eliminating an additional curing space or a curing process.

Figure 7:
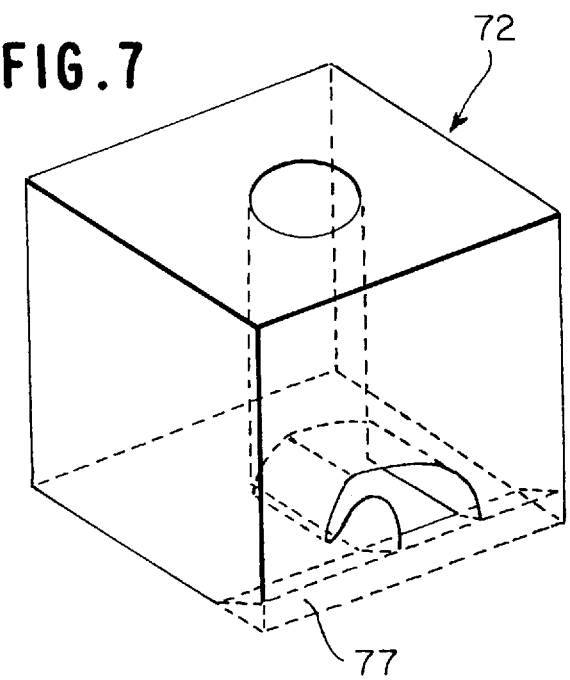
FIG. 7 is a schematic view showing an example of the structure of the die according to the present invention.

The die in the example is formed to have a corner cut at a bottom portion shaped in a substantially rectangular parallelepiped. The resinous material passage is arranged in substantially parallel with the bottom portion (the rear bottom thereof). As a result, the passage is partly exposed at the forward bottom having the corner cut, and the resinous material can be extruded onto the surface of the panel in such a state that the forward bottom is arranged in substantial parallel with the surface of the panel. The shape of the die which has the corner cut is schematicly shown in FIG. 7. When the shape of the die is such a substantially rectangular parallelepiped, a region 77 of a die model 72 indicated by broken lines is a portion cut from the rectangular parallelepiped.

With regard to the shape of the die, the die may be formed to have the passage curved or inclined therein so as to give a predetermined inclination to the passage with respect to the bottom portion of the die without cutting the corner of the rectangular parallelepiped, besides the example shown. To sum up, it is a preferred mode that the passage for shaping the resinous material is inclined with respect to a portion of the die in parallel with the surface of the panel.

A die which is formed so that a portion of the die opposed to the panel is not parallel with the panel can be also used as the die according to the present invention. In that case, it is sufficient that the passage has a portion formed inclined with respect to and out of parallel with the surface of the panel. Formation of the die in such a manner can not only sufficiently shape the resinous material as desired but also prevent the material from being supplied to the panel in an unstable manner even if the die and the panel are separated at the seamed portion. Avoidance of an unstable supply of the material can stabilize the shape of the shaped product and obtain the frame having good appearance.

The die which is formed to have the corner cut from the rectangular parallelepiped as shown in FIGS. 2 and 6 can be readily obtained by using e.g. a die base portion 24, a first plate-shaped portion 25 and a second plate-shaped portion 26 as constituent parts. The die base portion 24 has a rear side communicated with the extruder and has the passage 22 formed therein. The first plate-shaped portion 25 is arranged downstream of the die base portion 24 and has a lower surface inclined. The first plate-shaped portion has a passage formed therein to have the same cross-section as the passage 22 in the die base portion 24. The second plate-shaped portion 26 is arranged at the front of the die and has a lower surface (21) inclined. The second plate-shaped portion 26 has a passage formed therein so that the lower surface (21) is opened. The passage in the second plate-shaped portion may have the same cross-section as the passages in the die base portion 24 and the first plate-shaped portion 25, or have a slightly smaller cross-sectional area than the passages in the die base portion 24 and the first plate-shaped portion 25 by the cut portion at the bottom surface of the second plate-shaped portion.

Referring to FIG. 3 with respect to this example, the sectional view of the die base member 24 corresponds to FIG. 3(a), and the front view of the second plate-shaped portion 26 corresponds to FIG. 3(b).

It has been stated that a thermoplastic resinous material is preferable as the resinous material. The thermoplastic resinous material is heated to a temperature ranging from 150° C. to 300° C. in order to be extruded. It requires that the heat-resistant hose be provided between the material supplying device and the die to move the die. The provision of the heat-resistant hose sometimes makes treatment of the die by the operating robot difficult. The arrangement where the die is fixed and the panel is movable as shown in the example of FIG. 5 is preferable because it is possible to overcome this difficulty.

The frame may be unified only to one surface at a peripheral portion of the panel or one surface and the end surface at the peripheral portion according to designing. The frame may be also unified to one surface, the end surface and the rear surface of the panel though a control system is slightly complicated. For unification to the three surfaces it is sufficient that when the shaped product has been formed until a position near to the seamed portion, the die and the panel are relatively moved so that the die escapes toward an outer circumference of the panel. In this case, the operating robot which moves the panel and the die is taught a track so that the robot and the die is separated from the panel in a surface direction at a location near to the seamed portion.

As explained, in accordance with the present invention, the resinous material can be extruded the die to have a predetermined shape in section by conserving a die passage enough to shape the resinous material and separating the die and the panel. The shaped product can be formed on the panel so as to have excellent shape without the beginning of the already formed shaped interfering with the die at the seamed portion.

In particular, the presence of a cut corner in the die and the provision of a short opened portion at the passage opposed to a surface of the panel can give good appearance to the frame while keeping a bonded force between the panel and the frame.

In addition, the cut corner can be opposed to the panel surface so as to be in substantial parallel with the surface to realize smooth relative movement between the panel and the die. In that case, the passage can be arranged to be in parallel with a portion without a cut corner to easily form the passage by only an inner wall of the die for shaping the resinous material. In that manner, the shaped product, which is excellent in shape as stated earlier, can be easily formed on the panel.

Obviously, numerous modifications and variations of the present invention are possible in light of the above teachings. It is therefore to be understood that within the scope of the appended claims, the invention may be practiced otherwise than as specifically described herein.

What is claimed is:

1. A method of preparing a window panel with a resinous frame, comprising:

relatively moving a window panel and a die for extruding a resinous material so that the die is moved along a peripheral portion of the window panel, and extruding the resinous material from the die in a predetermined shape to form a shaped product for a resinous frame on the peripheral portion of the window panel in a one-piece construction; wherein the relative movement of the die and the panel is carried out by using an operating robot which has been taught a track to follow; and wherein the step of extruding the resinous material includes shaping the resinous material using a passage, inclined with respect to a surface of the panel, of the die which is formed to have substantially the same cross-section as that of the shaped product so as to have the entire circumference in cross-section surrounded by an inner wall of the die, and using an extruding orifice of the die for extruding the resinous material which is formed to have a cross-section in substantial conformity with the cross-section of the shaped product by opening the orifice at a side where the shaped product contacts with the panel, and surrounding three sides of the orifice except for the opened side by the inner wall of the die; and contacting the material extruded at the opened side of the extruding orifice with the panel to form the shaped product on the panel in a one-piece construction.

2. A method of preparing a window panel with a resinous frame according to claim 1, wherein the panel is moved by the operating robot to move the panel and the die relatively; and wherein the panel is moved diagonally downward in a moving direction of the die to separate the die and the panel when the die has moved around the peripheral portion of the panel and has returned at the position just before the beginning of the shaped product.

3. A method of preparing a window panel with a resinous frame according to claim 1, wherein the die is moved by the operating robot to move the panel and the die relatively; and wherein the die is moved diagonally upward in a moving direction of the panel to separate the die and the panel when the die has moved around the peripheral portion of the panel and has returned at the position just before the beginning of the shaped product.

4. A method of preparing a window panel with a resinous frame according to claim 1, wherein a rear bottom of the bottom of the die is opposed to the panel so as to be inclined with respect to the surface of the panel; and wherein a front bottom of the die is opposed to the panel so as to be in parallel to the surface of the panel, thereby positioning the passage for shaping the resinous material so as to be inclined with respect to the panel.

5. A method of preparing a window panel with a resinous frame according to claim 1, wherein the die which has a corner cut is used, the corner being near to an extruding orifice for extruding the resinous material; and wherein the die is opposed to the panel so that the passage in the die is opened toward the panel, the shaped product and the panel are contacted together at the opened portion, and the die and the panel are separated when the die has arrived at the position just before the beginning of the shaped product.

6. A method of preparing a window panel with a resinous frame according to claim 1, wherein the die and the panel are arranged so that a surface of the panel and the three sides of the inner wall except for the opened side where the shaped product contacts with the panel define, at the extruding orifice, substantially the same cross-section as that of the shaped product when the shaped product is formed before separating the die and the panel.

7. A method of preparing a window panel with a resinous frame according to claim 1, wherein the window panel is glass sheet for a vehicle.

8. A method of preparing a window panel with a resinous frame according to claim 1, wherein the resinous material is of a thermoplastic resinous material.

9. A method of preparing a window panel with a resinous frame wherein the window panel includes a surface, a rear surface thereof and an end surface, comprising:
relatively moving a window panel and a die for extruding a resinous material so that the die is moved along a surface, or a surface and an end surface of the window panel at a peripheral portion thereof, and extruding the resinous material from the die in a predetermined shape to form a shaped product for a resinous frame on the surface, or the surface and the end surface at the peripheral portion of the window panel in a one-piece construction; wherein the relative movement of the die and the panel is carried out by using an operating robot which has been taught a track to follow; and wherein the step of extruding the resinous material includes shaping the resinous material using a passage, inclined with respect to a surface of the panel, of the die which is formed to have substantially the same cross-section as that of the shaped product so as to have the entire circumference in cross-section surrounded by an inner wall of the die, and using an extruding orifice of the die for extruding the resinous material which is formed to have a cross-section in substantial conformity with the cross-section of the shaped product by opening the orifice near the surface of the panel, and surrounding three sides of the orifice except for the opened side by the inner wall of the die; and contacting the material extruded at the opened side of the extruding orifice with the panel to form the shaped product on the panel in a one-piece construction.

10. A method of preparing a window panel with a resinous frame according to claim 9, wherein the panel is moved by the operating robot to move the panel and the die relatively; and wherein the panel is moved diagonally in a moving direction of the rear surface to separate the die and the panel when the die has moved around the peripheral portion of the panel and has returned at the position just before the beginning of the shaped product.

11. A method of preparing a window panel with a resinous frame according to claim 9, wherein the die is moved by the operating robot to move the panel and the die relatively, and wherein the die is moved diagonally in a moving direction of the surface to separate the die and the panel when the die has moved around the peripheral portion of the panel and has returned at the position just before the beginning of the shaped product.

12. A method of preparing a window panel with a resinous frame according to claim 9, wherein a rear bottom of the bottom of the die is opposed to the surface of the panel so as to be inclined with respect to the surface of the panel; and wherein a front bottom of the die is opposed to the surface of the panel so as to be in parallel to the surface of the panel, thereby positioning the the passage for shaping the resinous material so as to be inclined with respect to the surface.

13. A method of preparing a window panel with a resinous frame according to claim 9, wherein the die which has a corner cut is used, the corner being near to an extruding orifice for extruding the resinous material; and wherein the die is opposed to the surface of the panel so that the passage in the die is opened toward the surface of the panel, the shaped product and the surface are contacted together at the opened portion, and the die and the panel are separated when the die has arrived at the position just before the beginning of the shaped product.

14. A method of preparing a window panel with a resinous frame according to claim 9, wherein the die and the panel are arranged so that at least one surface of the panel and the three sides of the inner wall except for the opened side where the shaped product contacts with the panel define, at the extruding orifice, substantially the same cross-section as that of the shaped product when the shaped product is formed before separating the die and the panel.

15. A method of preparing a window panel with a resinous frame according to claim 9, wherein the window panel is glass sheet for a vehicle.

16. A method of preparing a window panel with a resinous frame according to claim 9, wherein the resinous material is of a thermoplastic resinous material.

17. A method of preparing a window panel with a resinous frame according to claim 1, wherein the operating robot has been taught the track so as to separate the die and the panel in a direction away from the plane of the panel when the die has moved around the peripheral portion of the panel and has reached a position of the panel close to a starting point of the track.

18. A method of preparing a window panel with a resinous frame according to claim 17, wherein the step of extruding the resinous material includes positioning a rear bottom of the die opposed to the panel so as to be inclined with respect to the surface of the panel, and positioning a front bottom of the die opposed to the panel so as to be in parallel to the surface of the panel, thereby positioning the passage for shaping the resinous material so as to be inclined with respect to the panel.

19. A method of preparing a window panel with a resinous frame according to claim 17, wherein the step of extruding the resinous material includes using a corner cut in the die near an extruding orifice for extruding the resinous material, and positioning the die opposed to the panel so that the passage in the die is opened toward the panel, contacting together the shaped product and the panel, and separating the die and the panel when the die has arrived at the position of the panel close to a starting point of the track.

20. A method of preparing a window panel with a resinous frame according to claim 9, wherein the operating robot has been taught the track to follow so as to separate the die and the panel in a direction away from the plane of the panel when the die has moved around the peripheral portion of the panel and has reached a position of the panel close to a starting point of the track.

21. A method of preparing a window panel with a resinous frame according to claim 20, wherein the step of extruding the resinous material includes positioning a rear bottom of the die opposed to the surface of the panel so as to be inclined with respect to the surface of the panel, and positioning a front bottom of the die opposed to the surface of the panel so as to be in parallel to the surface of the panel, thereby positioning the passage for shaping the resinous material so as to be inclined with respect to the surface.

22. A method of preparing a window panel with a resinous frame according to claim 20, wherein the step of extruding the resinous material includes using a corner cut in the die near an extruding orifice for extruding the resinous material, and positioning the die opposed to the surface of the panel so that the passage in the die is opened toward the surface of the panel, contacting together the shaped product and the surface, and separating the die and the panel when the die has arrived at the position of the panel close to a starting point of the track.

* * * * *